(12) United States Patent
Corby, Jr. et al.

(10) Patent No.: US 10,963,749 B2
(45) Date of Patent: Mar. 30, 2021

(54) SYSTEMS AND METHODS FOR AUTOMATIC VEHICLE IMAGING

(71) Applicant: Cox Automotive, Inc., Atlanta, GA (US)

(72) Inventors: James Lee Corby, Jr., Atlanta, GA (US); Julie Warpool, Atlanta, GA (US); John Hensman, Atlanta, GA (US); Josh Agee, Atlanta, GA (US)

(73) Assignee: COX AUTOMOTIVE, INC., Atlanta, GA (US)

( * ) Notice: Subject to any disclaimer, the term of this patent is extended or adjusted under 35 U.S.C. 154(b) by 164 days.

(21) Appl. No.: 14/965,175

(22) Filed: Dec. 10, 2015

(65) Prior Publication Data
US 2016/0173740 A1 Jun. 16, 2016

Related U.S. Application Data

(60) Provisional application No. 62/091,273, filed on Dec. 12, 2014.

(51) Int. Cl.
*G06K 9/62* (2006.01)
*H04N 7/18* (2006.01)
(Continued)

(52) U.S. Cl.
CPC .......... *G06K 9/6267* (2013.01); *B64C 39/024* (2013.01); *F16M 11/08* (2013.01);
(Continued)

(58) Field of Classification Search
None
See application file for complete search history.

(56) References Cited

U.S. PATENT DOCUMENTS 5,270,756 A * 12/1993 Busenberg ............ H04N 7/185
348/144
6,434,329 B1 8/2002 Dube et al.
(Continued)

FOREIGN PATENT DOCUMENTS

| KR | 10-2009-0130719 A | 12/2009 |
| KR | 10-2012-0097563 A | 9/2012 |
| KR | 10-2014-0098040 A | 8/2014 |

OTHER PUBLICATIONS

Gillett, R., et al. "A hybrid range imaging system solution for in-flight space shuttle inspection." Canadian Conference on Electrical and Computer Engineering 2004 (IEEE Cat. No. 04CH37513). vol. 4. IEEE, 2004. (Year: 2004).*
(Continued)

*Primary Examiner* — Jayanti K Patel
*Assistant Examiner* — Stefan Gadomski
(74) *Attorney, Agent, or Firm* — Eversheds Sutherland (US) LLP

(57) ABSTRACT

Example embodiments of automatic vehicle imaging systems may include cameras configured to capture images and/or video. Cameras may be coupled to booms and/or unmanned vehicles, such as unmanned aerial vehicles and unmanned ground vehicles. Example methods may include determining a camera path for a vehicle, wherein the camera path is a path to be followed by a camera while the camera captures images or video of the vehicle, positioning the camera at the starting position, and capturing a first image or video segment of the vehicle using the camera. The example method may include associating the first image or video segment with a first description, moving the camera to a second position along the camera path, capturing a second image or video segment of the vehicle, and associating the second image or video segment with a second description.

19 Claims, 10 Drawing Sheets

(51) Int. Cl.

| | | |
|---|---|---|
| *H04N 5/222* | (2006.01) | |
| *H04N 5/232* | (2006.01) | |
| *B64C 39/02* | (2006.01) | |
| *F16M 11/20* | (2006.01) | |
| *F16M 11/08* | (2006.01) | |
| *F16M 11/26* | (2006.01) | |
| *F16M 13/02* | (2006.01) | |
| *G01S 13/86* | (2006.01) | |
| *G01S 17/06* | (2006.01) | |

(52) U.S. Cl.
CPC ..... *F16M 11/2014* (2013.01); *F16M 11/2085* (2013.01); *F16M 11/26* (2013.01); *F16M 13/027* (2013.01); *H04N 5/222* (2013.01); *H04N 5/232* (2013.01); *H04N 5/23222* (2013.01); *H04N 7/185* (2013.01); *B60R 2300/301* (2013.01); *B64C 2201/127* (2013.01); *G01S 13/867* (2013.01); *G01S 17/06* (2013.01)

(56) References Cited

U.S. PATENT DOCUMENTS

| | | | | |
|---|---|---|---|---|
| 7,889,931 | B2* | 2/2011 | Webb | G01N 21/8806 382/141 |
| 8,112,325 | B2* | 2/2012 | Foy | G06Q 30/06 705/27.2 |
| 8,830,320 | B2* | 9/2014 | Swinford | H04N 7/18 348/148 |
| 9,373,149 | B2* | 6/2016 | Abhyanker | G06Q 50/28 |
| 9,555,899 | B2* | 1/2017 | Miller | B64F 1/02 |
| 9,776,200 | B2* | 10/2017 | Busby | B05B 9/007 |
| 2001/0053284 | A1* | 12/2001 | Shin | G06T 15/20 396/5 |
| 2002/0135677 | A1* | 9/2002 | Noro | H04N 7/181 348/143 |
| 2004/0183803 | A1* | 9/2004 | Longo | H04N 5/2259 345/473 |
| 2006/0074557 | A1* | 4/2006 | Mulligan | G05D 1/0094 701/13 |
| 2006/0232583 | A1 | 10/2006 | Petrov et al. | |
| 2007/0057815 | A1* | 3/2007 | Foy | G06Q 30/06 340/905 |
| 2008/0066790 | A1* | 3/2008 | Rems | B08B 3/024 134/123 |
| 2009/0046895 | A1* | 2/2009 | Pettersson | G01B 11/005 382/106 |
| 2009/0160930 | A1* | 6/2009 | Ruppert | G06T 1/0007 348/37 |
| 2009/0316012 | A1* | 12/2009 | Matos | H04N 1/00323 348/208.14 |
| 2010/0013927 | A1* | 1/2010 | Nixon | G01C 11/06 348/144 |
| 2010/0121574 | A1* | 5/2010 | Ariyur | G05D 1/101 701/301 |
| 2010/0201829 | A1* | 8/2010 | Skoskiewicz | G08G 1/04 348/211.2 |
| 2010/0228406 | A1* | 9/2010 | Hamke | G05D 1/0038 701/3 |
| 2010/0283853 | A1* | 11/2010 | Acree | G01C 11/00 348/144 |
| 2010/0299014 | A1* | 11/2010 | Bouvier | A61B 6/4405 701/25 |
| 2011/0090337 | A1 | 4/2011 | Klomp et al. | |
| 2012/0106800 | A1* | 5/2012 | Khan | G06K 9/00651 382/104 |
| 2012/0155744 | A1* | 6/2012 | Kennedy | A63F 13/10 382/154 |
| 2013/0191082 | A1* | 7/2013 | Barthelet | G06K 9/00637 703/1 |
| 2013/0222684 | A1 | 8/2013 | Mueller et al. | |
| 2014/0010412 | A1* | 1/2014 | Price | G06T 1/0007 382/105 |
| 2014/0034775 | A1* | 2/2014 | Hutson | B64C 27/006 244/17.17 |
| 2014/0034776 | A1* | 2/2014 | Hutson | F16M 11/18 244/17.17 |
| 2014/0046589 | A1* | 2/2014 | Metzler | G01B 21/04 701/514 |
| 2014/0117147 | A1* | 5/2014 | Hanna | B64C 39/024 244/2 |
| 2014/0131510 | A1* | 5/2014 | Wang | B64C 39/024 244/17.23 |
| 2014/0132804 | A1* | 5/2014 | Guissin | G02B 13/06 348/239 |
| 2014/0152806 | A1* | 6/2014 | Hauk | H04N 5/222 348/121 |
| 2014/0168420 | A1* | 6/2014 | Naderhirn | G01N 21/88 348/128 |
| 2014/0192193 | A1* | 7/2014 | Zufferey | H04N 7/183 348/144 |
| 2014/0313334 | A1* | 10/2014 | Slotky | H04N 5/23222 348/148 |
| 2014/0316614 | A1* | 10/2014 | Newman | G06Q 30/0611 701/3 |
| 2014/0316616 | A1* | 10/2014 | Kugelmass | G05D 1/101 701/8 |
| 2015/0039522 | A1* | 2/2015 | Dillard | G06Q 10/20 705/305 |
| 2015/0066248 | A1* | 3/2015 | Arbeit | G01C 21/20 701/2 |
| 2015/0097924 | A1 | 4/2015 | Hauk | |
| 2015/0106212 | A1 | 4/2015 | Hauk | |
| 2015/0168719 | A1* | 6/2015 | Kim | B60R 1/00 345/7 |
| 2015/0183512 | A1* | 7/2015 | Jensen | B64C 39/022 244/76 R |
| 2015/0292888 | A1* | 10/2015 | Haglund | G05D 1/0808 701/523 |
| 2015/0363717 | A1* | 12/2015 | Lim | G06Q 10/0633 705/4 |
| 2016/0016664 | A1* | 1/2016 | Basuni | B64C 39/024 244/17.13 |
| 2016/0017866 | A1* | 1/2016 | Craft | F03D 11/0091 348/46 |
| 2016/0018822 | A1* | 1/2016 | Nevdahs | G05D 1/0094 701/26 |
| 2016/0047657 | A1* | 2/2016 | Caylor | G01C 21/005 701/521 |
| 2016/0082460 | A1* | 3/2016 | McMaster | B05B 12/122 701/2 |
| 2016/0129999 | A1* | 5/2016 | Mays | B64C 39/024 701/2 |
| 2016/0144982 | A1* | 5/2016 | Sugumaran | B64C 25/32 244/103 R |
| 2016/0150192 | A1* | 5/2016 | Cheatham, III | G06K 9/00 348/143 |
| 2016/0216711 | A1* | 7/2016 | Srivastava | B64D 1/02 |
| 2016/0229530 | A1* | 8/2016 | Welsh | B64C 39/024 |
| 2016/0247115 | A1* | 8/2016 | Pons | G06Q 10/087 |
| 2016/0299233 | A1* | 10/2016 | Levien | G08G 5/0052 |
| 2016/0304198 | A1* | 10/2016 | Jourdan | B64C 39/024 |
| 2016/0347443 | A1* | 12/2016 | Lee | B64C 27/08 |
| 2016/0347476 | A1* | 12/2016 | Andryukov | B64C 39/024 |
| 2017/0053169 | A1* | 2/2017 | Cuban | H04N 7/185 |
| 2017/0097645 | A1* | 4/2017 | Garland | B64D 47/08 |
| 2017/0184524 | A1* | 6/2017 | Uetaki | B64C 39/024 |
| 2019/0064794 | A1* | 2/2019 | Chen | G05D 1/0016 |

OTHER PUBLICATIONS

International Search Report dated Apr. 1, 2016 for Application No. PCT/US2015/065216, pp. 1-3, Korean Intellectual Patent Office, Republic of Korea.

Written Opinion dated Apr. 1, 2016 for Application No. PCT/US2015/065216, pp. 1-9, Korean Intellectual Property Office, Republic of Korea.

(56) References Cited

OTHER PUBLICATIONS

Communication issued in European Application No. 15867242.8, dated Jun. 14, 2018, 14 pages.

* cited by examiner

SYSTEMS AND METHODS FOR AUTOMATIC VEHICLE IMAGING

CROSS-REFERENCE TO RELATED APPLICATIONS

This application claims the benefit of U.S. Provisional Application No. 62/091,273, filed Dec. 12, 2014.

TECHNICAL FIELD

The present disclosure generally relates to automatically capturing images and/or video of vehicles.

BACKGROUND

When selling goods, such as vehicles, advertisements may be used. The advertisements may include images and/or video. In some instances, potential purchasers may rely on the images and/or video in the advertisements to determine interest in the vehicle. A number of images and/or videos may assist potential purchasers in determining interest in the vehicle as well. With used vehicles in particular, images may be desirable so that potential buyers can see damage or flaws in the vehicle's physical condition. However, capturing images and/or video may be time consuming or difficult for different vehicles.

BRIEF DESCRIPTION OF THE DRAWINGS

Reference will now be made to the accompanying figures and diagrams, which are not necessarily drawn to scale, and wherein.

DETAILED DESCRIPTION

Figure 1:
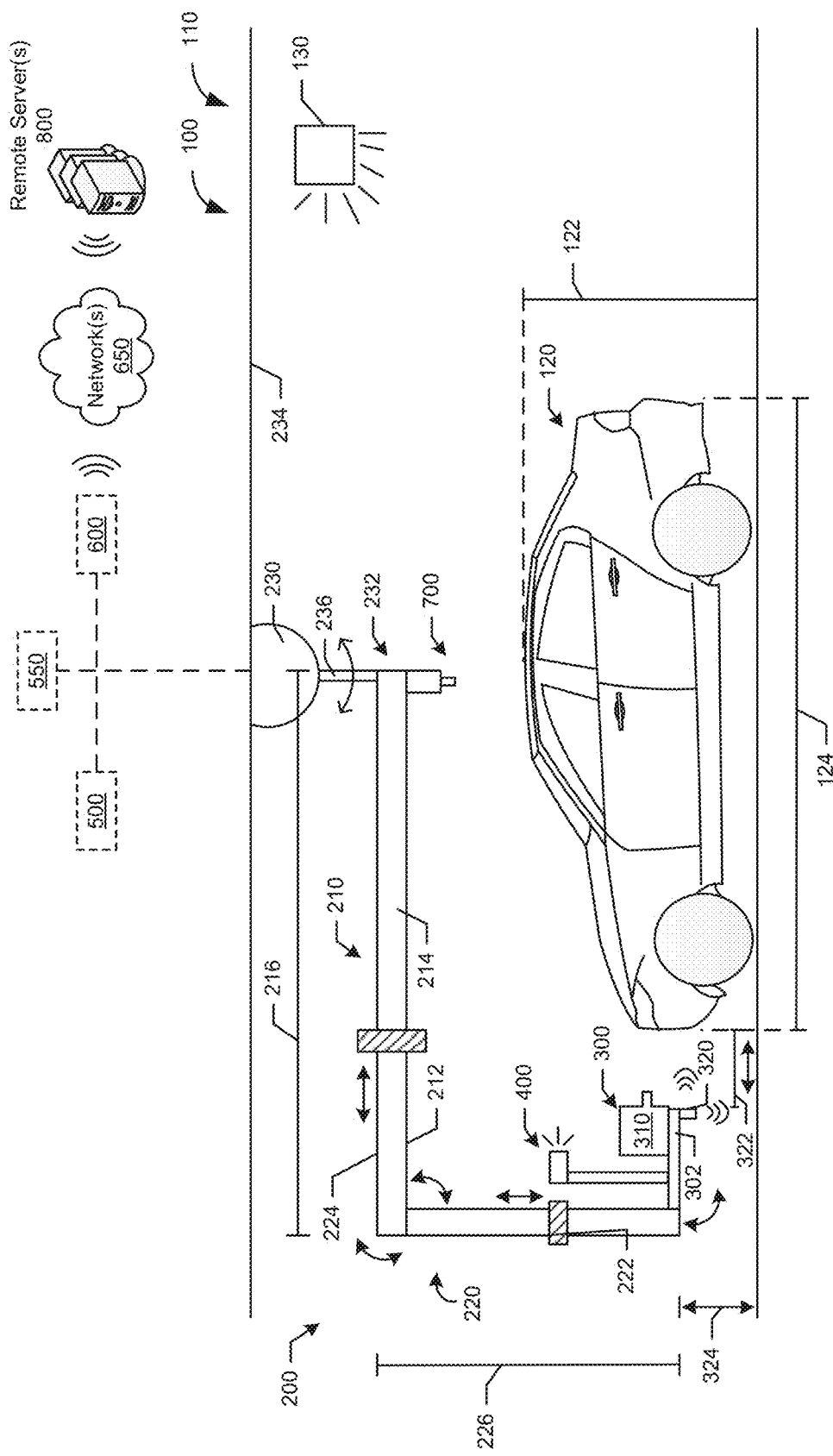
FIG. 1 depicts a telescoping boom system for automatic vehicle imaging in accordance with one or more embodiments of the disclosure.

In the following description, numerous specific details are set forth. However, it should be understood that embodiments of the present disclosure may be practiced without these specific details. In other instances, well-known methods, structures, and techniques have not been shown in detail in order not to obscure an understanding of this description. References to "one embodiment," "an embodiment," "example embodiment," "various embodiments," and so forth indicate that the embodiment(s) of the present disclosure so described may include a particular feature, structure, or characteristic, but not every embodiment necessarily includes the particular feature, structure, or characteristic. Furthermore, the repeated use of the phrase "in one embodiment" does not necessarily refer to the same embodiment, although it may.

As used herein, unless otherwise specified, the use of the ordinal adjectives "first," "second," "third," etc., to describe a common object merely indicates that different instances of like objects are being referred to and are not intended to imply that the objects so described must be in a given sequence, either temporally, spatially, in ranking, or in any other manner.

As used herein, unless otherwise specified, the term "controller" refers, in general, to an electronic communication device, both wired and wireless, and more particularly to one or more of the following: a portable electronic device, a telephone (e.g., cellular phone, smartphone), a computer (e.g., laptop computer, tablet computer, desktop computer, wearable computer), a portable media player, a personal digital assistant (PDA), a kiosk computer for public use, or any other electronic device having a networked capability.

As used herein, unless otherwise specified, the term "server" may refer to any computing device having a networked connectivity and configured to provide one or more dedicated services to clients, such as a controller.

Embodiments of the disclosure may provide automated vehicle imaging. Imaging may include images and/or video of exteriors and/or interiors of vehicles. The images and/or video may be captured in high resolution. High resolution images may be used for advertisements or other promotional materials for vehicles, or to illustrate the condition of the vehicles, and may result in increased interest in the vehicle from potential purchasers. The images and/or videos captured using the systems and methods described herein may result in higher sales prices of the subject vehicle, which may reflect increased profits compared to vehicles sold without images and/or video generated using the systems and methods described herein. Although discussed in terms of vehicles, the imaging systems described herein may be used to capture images and/or videos of other items. Images/videos may also increase the potential pool of buyers by better disclosing vehicle appearance and condition to online buyers.

Embodiments of the disclosure may include unmanned vehicles, such as unmanned aerial vehicles or unmanned ground vehicles, and/or telescoping booms, such as booms mounted in a booth or to a frame or cage (any of which may be permanent or temporary structures, static or moveable). In certain embodiments, an unmanned vehicle may be routed to a vehicle and may be configured to capture images and/or video of the vehicle. For example, a camera may be mounted on a drone (e.g., tethered drone, free flight drone, etc.) or other unmanned aerial vehicle. The drone may be sent to a vehicle location and may locate the vehicle. The drone may fly or otherwise maneuver about the vehicle and guide the camera along a camera path. The camera path may be a path about the vehicle that the camera is to follow while capturing images and/or video. The camera path may include a vehicle separation distance indicative of a distance that the camera is to be separated from the vehicle at one or more positions along the camera path, an elevation indicative of a distance above a ground level at which the camera should be positioned at one or more positions along the camera path, and may include angle information indicative of an angle at which the camera is to be positioned relative to the vehicle. In some embodiments, the camera path may be defined relative to the vehicle or relative to the ground. The camera may capture images and/or video as the drone maneuvers about the vehicle. As a result, images and/or video may be automatically captured without direct human involvement. In another example, a camera may be mounted on an unmanned ground vehicle, such as a rover or other remote control vehicle. The camera may be positioned on a telescoping boom. The unmanned ground vehicle may locate a vehicle and drive around the vehicle while guiding the camera along a camera path. The camera may capture images and/or video while moving along the camera path. Certain embodiments may include a telescoping boom. For example, a telescoping boom may be mounted in a booth or an outdoor canopy. A camera may be coupled to the telescoping boom. The boom may have complete degrees of freedom, such that the boom may rotate or swivel with respect to a ceiling (i.e., the boom may rotate about a vertical axis, a horizontal axis, or all axes). The boom may include arms configured to rotate with respect to each other. The camera may be mounted on the boom and may be configured to rotate with respect to the boom, such that angles of images or videos captured by the camera may be adjusted. A vehicle may enter the booth, and the telescoping boom may be positioned at a starting point of a camera path. The telescoping boom may guide the camera along the camera path. The vehicle may be removed from the booth upon completion of image capturing. The vehicle imaging systems described herein may be controlled by a controller that receives input or feedback from the one or more sensors. The controller may operate the vehicle imaging system. Embodiments of vehicle imaging systems and methods will be discussed with reference to the figures. Regardless of boom, UAV or UGV implementation, the camera path may also be controlled by a camera positioning/zoom system to generate optimal images and/or video. Such camera positioning/zoom system may determine the optimal camera path based, in part, on inputs from sensors described elsewhere herein, and also the camera's technical specifications and capabilities (e.g., zoom).

Embodiments of the disclosure may include one or more sensors, such as a lidar sensor and/or other sensors (e.g., depth sensing sensors, positioning sensors, motion tracking sensors, infrared sensors, light sensors, gps sensors, location sensors, range measurement sensors, accelerometers, velocity meters, tilt sensors, 2-axis or 3-axis compass sensors, distance sensors, etc.), configured determine a distance, position and orientation between the camera and another object. For example, a lidar sensor may be used to determine a distance of the camera from the vehicle and/or from the ground. Using output from the one or more sensors, the camera may be positioned and/or guided about a camera path. Among other things, the sensors may also be used to determine the dimensions of the vehicle, the position of the camera system, the orientation of the camera system (e.g., relative to the vehicle).

Embodiments of the disclosure may determine camera paths based at least in part on vehicle dimensions. For example, based at least in part on a height, a length, and a width of a particular vehicle, a camera path may vary. If images and/or video are to be captured along a window level of the vehicle, the distance the camera should be elevated from the ground will vary based on the vehicle dimensions. Similarly, a camera path may vary based on a height and length of a vehicle. Additionally, the camera path may also vary based on whether there are particular points of interest on the vehicle that should be imaged. Such points of interest may be determined by sensors, vehicle make/model data, or manually entered by a user.

Referring to FIG. 1, one embodiment of a vehicle imaging system in accordance with the disclosure is illustrated. The vehicle imaging system 100 may be positioned in a booth 110 with a vehicle 120. The booth 110 may include ambient lighting, such as ambient lighting from a light source 130. In some embodiments, ambient lighting may be controlled such that ambient light is activated or dimmed/brightened at certain times. For instance, the lighting in one part of the space may be increased for a particular image in lieu of, or to complement, the lighting on the camera system. The vehicle imaging system 100 may include a boom assembly 200, a camera assembly 300 mounted on the boom assembly 200, and a lighting assembly 400 mounted on the boom assembly 200. The boom assembly 200 may be moved or otherwise operated by a drive motor 500. In some embodiments, the boom assembly 200 may be manually positionable, for example by an operator using a counterbalance or the like to position or move the boom assembly 200. The vehicle imaging system 100 may include a power source 550 and a controller 1410 (shown in FIG. 10). The vehicle imaging system 100 may also include an overhead camera 700.

The boom assembly 200 may include one or more members coupled together. In some embodiments, some of the members may be telescoping. For example, in FIG. 1, the boom assembly 200 includes a first telescoping member 210 and a second telescoping member 220 rotatably coupled to the first telescoping member 210. The first telescoping member 210 may be coupled to a ceiling mount 230 via a swivel joint 232 configured such that the first telescoping member 210 may swivel with respect to the ceiling mount 230. The ceiling mount 230 may be fixed or otherwise mounted to a ceiling 234 of the booth 110 and may include an extension 236 to which the first telescoping member 210 of the boom assembly 200 is coupled via the swivel joint 232. Other embodiments may include different joints that allow for rotational motion between the first telescoping member 210 and the ceiling mount 230. The extension 236 may be of any desired length and may be telescoping in some embodiments, such that the boom assembly 200 can be raised or lowered with respect to the ceiling 234.

The first and second telescoping members 210, 220 may be configured to telescope, thereby adjusting a total length of the respective first and second telescoping members 210, 220. For example, the first and second telescoping members 210, 220 may include a first portion that can be slidably received within a second portion, such that the first portion is inside the second portion, which reduces a total length of the member. In the illustrated embodiment, the first telescoping member 210 may include a first portion 212 that can be slidably received in a second portion 214 to reduce a total length 216 of the first telescoping member 210. Similarly, the second telescoping member 220 may include a first portion 222 that can be slidably received in a second portion 224 to reduce a total length 226 of the second telescoping member 220. The telescoping of the first and second telescoping members 210, 220 may be implemented, in one example, by the drive motor 500, as described herein.

The first telescoping member 210 may be rotatably coupled to the second telescoping member 220 to create additional degrees of freedom for the camera assembly 300 and resultant images or video captured by the camera. The second telescoping member 220 may be configured to rotate and/or swivel about a central axis of the first telescoping member 210.

The first telescoping member 210 may be configured to move from substantially perpendicular to the extension 236 (e.g., substantially parallel to the ceiling 234) to an angled position with respect to the extension 236. In some embodiments, the first telescoping member 210 may be configured to move to a position substantially perpendicular to the ceiling 234. The first telescoping member 210 may be configured to rotate about the ceiling mount 230 in an entire circular pattern, or 360 degrees about the ceiling mount, as described herein.

The camera assembly 300 may be mounted on the boom assembly 200. In FIG. 1, the camera assembly 300 may be mounted at the second telescoping arm 220 of the boom assembly 200 via a camera mount 302. The camera mount 302 may be, in some embodiments, telescoping and/or rotatably attached to the second telescoping arm 220, which may allow the camera assembly 300 to move or rotate with respect to the second telescoping arm 220. The camera mount 302 may be configured such that angles of images captured by the camera 310 with respect to the vehicle 120 may be varied. The camera assembly 300 may include a camera 310 and one or more lidar sensors 320.

In other embodiments, the camera and/or lighting systems may be movably positioned on member 220, such that the camera and/or lighting systems can move up or down the member (automatically or manually). Such movement could be effectuated by, for example, actuators, a belt, geardrive or the like.

The camera 310 may include one or more replaceable lens elements and may be configured to capture images and/or video (such lens may be manually replaced by a user or may be automatically replaced by the system). In some embodiments, the camera 310 may be a stereo or stereoscopic camera with two or more lens elements with a separate image sensor for each lens element. In such embodiments, the camera 310 may be configured to capture three-dimensional or 3D images and/or video. The camera 310 may be substantially aligned with the first telescoping member 210 and may be aimed to capture images at a center of the booth 110.

The camera assembly 300 may include one or more lidar sensors 320. The lidar sensors 320 may be positioned about the camera 310 or elsewhere on the camera mount 302. The lidar sensors 320 may utilize light detection and ranging to remotely sense surroundings and generate three-dimensional environmental information. The lidar sensors 320 may measure distance by illuminating a target with a laser and analyzing reflected light. The lidar sensors 320 may be utilized by the vehicle imaging system 100 to determine positioning and/or initial placement of the camera 310, to determine a camera path and/or related movements of the boom assembly 200, to determine a distance 322 between the camera 310 and the vehicle 120, to determine a distance 324 between the camera 310 and a ground level, and/or to determine dimensions of a vehicle. For example, the lidar sensors 320 may be used to determine a height 122 and length 124 of the vehicle 120. To determine dimensions of the vehicle 120, the lidar sensors 320 may perform an initial scan of the vehicle 120. The lidar sensors 320 may be used for additional purposes or to generate additional data.

The lighting assembly 400 may be mounted to the camera mount 302, as shown, in FIG. 1, or in other embodiments, to the boom assembly 200, such as to the first or second telescoping member 210, 220. The lighting assembly 400 may be positioned such that the camera 310 is in between the lighting assembly 400 and the vehicle 120 (e.g., the lighting is provided from "behind" the camera). The lighting assembly 400 may include one or more light bulbs, such as Light Emitting Diodes (LEDs), organic LEDs, or other forms of light bulbs. The lighting assembly 400 may be configured to illuminate or otherwise provide light in the direction of the vehicle 120 positioned in the booth 110. The lighting assembly 400 may be continuously powered on in some embodiments, or may be operated by a controller as described herein. In some embodiments, the lighting assembly 400 may provide a flash during imaging or coinciding with image capturing. In some embodiments, the lighting system may include a diffuser and/or a reflector. In embodiments where the booth 110 includes ambient lighting, such as from light source 130, the ambient lighting may be constantly on during imaging of the vehicle 120, and the light provided by the lighting assembly 400 may have a brightness greater than or equal to a brightness of the ambient light in the booth 110. In other embodiments, the ambient lighting may be dimmed/brightened, either locally or across the imaging area, to optimize the vehicle lighting and effectiveness of the lighting assembly 400.

The drive motor 500 may be configured to move or otherwise operate one or more portions of the boom assembly 200. For example, the drive motor 500 may cause telescoping of the first and/or second telescoping members 210, 220, rotation or other movement of the camera assembly 300 and/or the lighting assembly 400, and/or rotation of the boom assembly 200 about the vehicle 120.

The power source 550 may be wired or otherwise connected to components of the vehicle imaging system 100 and configured to provide power to the components. For example, the power source 550 may be electrically coupled to the boom assembly 200, the camera assembly 300, the lighting assembly 300, the drive motor 550, the controller 1410, and/or the overhead camera 700.

The overhead camera 700 may be similar to the camera 310 of the camera assembly 300 in that the overhead camera 700 is configured to capture images and/or video of the vehicle 120. Specifically, the overhead camera 700 may be configured to capture images and/or video of a top of the vehicle 120. The overhead camera 700 may be mounted to the first telescoping member 210 in some embodiments, or the ceiling mount 230, or another element of either the vehicle imaging system 100 or the booth 110, such as the ceiling 234.

The controller 1410 may be configured to operate one or more components of the vehicle imaging system 100. The controller 1410 may be configured to wirelessly communicate with one or more remote servers 800 via one or more networks 650. The controller 1410 may receive data or feedback from the lidar sensors 320 (or other sensors) to determine vehicle dimensions, and may determine, based at least in part on the vehicle dimensions, a camera path for the camera 310. The camera path may be substantially elliptical shaped and may go around the vehicle 120. The camera path may have a center point substantially corresponding to a center point of the vehicle 120. The controller 1410 may receive input from the sensors 320 to coordinate movement of the boom assembly 200 about the camera path. During the camera path, the controller 1410 may cause the camera 310 to capture images and/or video of the vehicle 120 as described herein.

Figure 2:
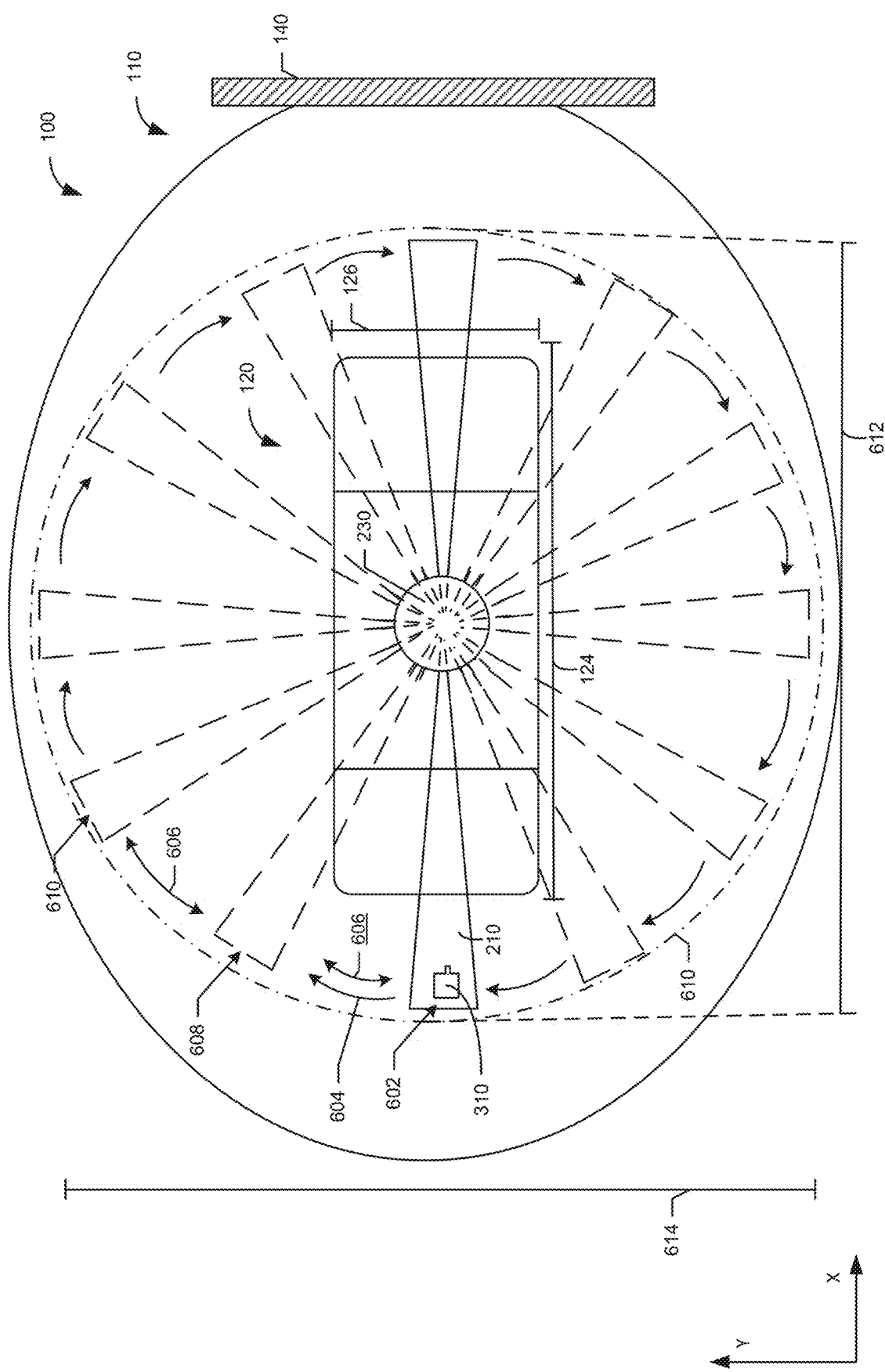
FIG. 2 depicts a top view of the system for automatic vehicle imaging of FIG. 1 in accordance with one or more embodiments of the disclosure.

Referring to FIG. 2, a top view of the booth 110 is illustrated. The booth 110 may have rounded corners such that images and/or videos captured by the vehicle imaging system 100 do not include perpendicular corners of the booth 110. The booth 110 may include an entrance gate 140. The controller 1410 may determine, for example using the lidar sensors 320, that the vehicle 120 has height 122, length 124, and a width 126. The vehicle dimensions may be determined during an initial scan of the vehicle, for example, or may be obtained from a database upon identification of the vehicle 120. Such an initial scan of the vehicle may alternatively be done by separate, booth-mounted sensors as the vehicle enters the booth.

Upon determining the vehicle dimensions, the controller 1410 may determine a starting position 602 for the camera 310. In some embodiments, the starting position 602 may be at the front of the vehicle 120, as shown in FIG. 2, while in other embodiments, the starting position 602 may be at one of the sides of the vehicle 120, such that vehicles can enter and exit the booth 110 without hitting or otherwise contacting the camera 310.

The starting position 602 may include a distance from the ground. The distance from the ground for the starting position 602 may be based at least in part on the height 122 of the vehicle 120. The starting position 602 may also include an angle of the camera 310 with respect to the camera mount 302 or the second telescoping member 220. In some embodiments, the starting position 602 may be about two-thirds the height 122 of the vehicle 120.

The controller 1410 may determine a camera path 610 for the camera 310 based at least in part on the vehicle dimensions. In the X-Y plane (e.g., plane parallel to the floor), the camera path 610 may be substantially elliptical and may have a center of the vehicle substantially at a center of the camera path 610. The camera path 610 may have a major axis width 612 greater than the length 124 of the vehicle 120, and a minor axis width 614 greater than the width 126 of the vehicle 120. Alternatively, the camera path 610 may be substantially circular in the X-Y plane.

The controller 1410 may position the camera 310 at the starting position 602 via feedback or input from the lidar sensors 320 and movement from the boom assembly 200 and/or camera mount 302.

The controller 1410 may initiate an imaging process by capturing images and/or video of the vehicle 120 while moving the camera 310 along the camera path 610. For example, the controller 1410 may cause the boom assembly 200 to move the camera 310 in direction 604 about the camera path 610. The boom assembly 200 may manipulate the telescoping members 210, 220 and/or the camera mount 302 to control angles and positioning of the camera 310 with respect to the vehicle 120. The controller 1410 may cause the boom assembly 300 to move the camera 310 continuously, for example at a speed of 3 miles per hour along the camera path 610 (although the speed may be slower or faster than 3 miles per hour as well). The camera 310 may be in continuous motion at a constant rate of speed in some embodiments, and images may be captured while the camera 310 is in motion. In some embodiments, the camera 310 may be stopped at predetermined intervals while images are captured. The boom assembly 200 may adjust the height of the camera 310 relative to the floor, depending on where the camera 310 is in the camera path.

The controller 1410 may cause the camera 310 to capture images and/or video continuously or at certain positions about the camera path 610. For example, in FIG. 2, the controller 1410 may cause the camera 310 to capture an image after every 10 degrees of movement about the camera path 610. The camera 310 may capture a first image at the starting position 602, and a second image at a second position 608 that is a predetermined number of degrees 606 advanced along the camera path 610 than the starting position 602. As the camera 310 moves along the camera path 610 to a third position 616, the camera 310 may capture a third image. The third position 616 may be the predetermined number of degrees 606 after the second position 608. In this manner, the camera 310 may capture images at, for example, 10 degree increments until the camera 310 returns to the starting position 602. In some instances, the angular rotation between images may vary based on where the camera is in the camera path (e.g., smaller angular rotations along the longer axis of an ellipse and larger angular rotations along the shorter axis). Further still, images may be taken more frequently in regions of particular interest, in which case subsequent 360 animations may have greater resolution of such features. During this rotation, the camera 310 may be adjusted to maintain the desired orientation to the vehicle (e.g., angle at which images are captured).

The controller 1410 may record a position and/or timing of each image captured by the camera 310. For example, the controller 1410 may determine a first image at the starting position 602, a second image at the second position 608, and so on. By determining that an image captured was tenth after the first image, the controller 1410 may determine that the tenth image may be 100 degrees about the camera path 610, based on the interval at which the controller 1410 caused the camera 310 to capture the images.

The controller 1410 may coordinate the lighting assembly 400 to provide flash during image captures by the camera 310. In some embodiments, the controller 1410 may cause the lighting assembly 400 to provide flash immediately prior to, or at substantially the same time as, the image capture by the camera 310. Timing of flash may be adjusted by the controller 1410 and may affect quality of images captured by the camera 310. Images captured may be automatically associated with a vehicle identifier of the vehicle, such as a Vehicle Identification Number (VIN).

A method of operation of the vehicle imaging system 100 will now be described with reference to FIGS. 1-2. The vehicle 120 may enter the booth 110. The vehicle 120 may be identified, via manual identification by an operator, via automatic identification, such as scanning of a VIN number, or by notification by another system, for example in a factors setting, by an assembly system or quality control system. The vehicle imaging system 100 may determine vehicle dimensions and a starting position for the camera 310. The vehicle imaging system 100 may determine a camera path for the camera 310 and may cause the camera 310, via manipulation of the boom assembly 200 and/or drive motor 500, to move about the camera path while capturing images.

Upon capturing the images, or as images are captured, the controller 1410 may label the images based at least in part on the timing at which the images were captured. For example, if the starting position is at a front of the vehicle, the first image may be labeled "hood." The second image, which may be a predetermined number of degrees further along the camera path, may be labeled, for example, "front right fender." Because the camera path is known to the controller 1410, the intervals at which the images were captured is known to the controller 1410, and the order in which the images were captured is known to the controller 1410, the controller 1410 may label the images accordingly. Example labels may include "front passenger side door," "rear passenger side door," "rear passenger fender," "trunk," "rear driver side fender," "rear driver side door," "driver door," "front left fender," and the like. In another example, an image captured 90 degrees from the starting position may indicate an image of the side of the vehicle has been captured, depending on the starting position.

In some embodiments, the number and selection of images may be determined, at least in part, by the vehicle identification and/or particular features on a given vehicle.

The controller 1410 may associate each of the captured images with a vehicle identifier, such that the images are associated with the vehicle. For example, the images may be associated with the VIN of the vehicle.

The controller 1410 may wirelessly transmit or otherwise upload the captured images and/or video to the remote servers 800 via the network(s) 650. The remote servers 800 may store the images and/or videos. The controller 1410 and/or remote servers 800 may analyze the captured images for backgrounds. Backgrounds may be removed from captured images via analysis of the images and identification of the vehicle edges.

Figure 3:
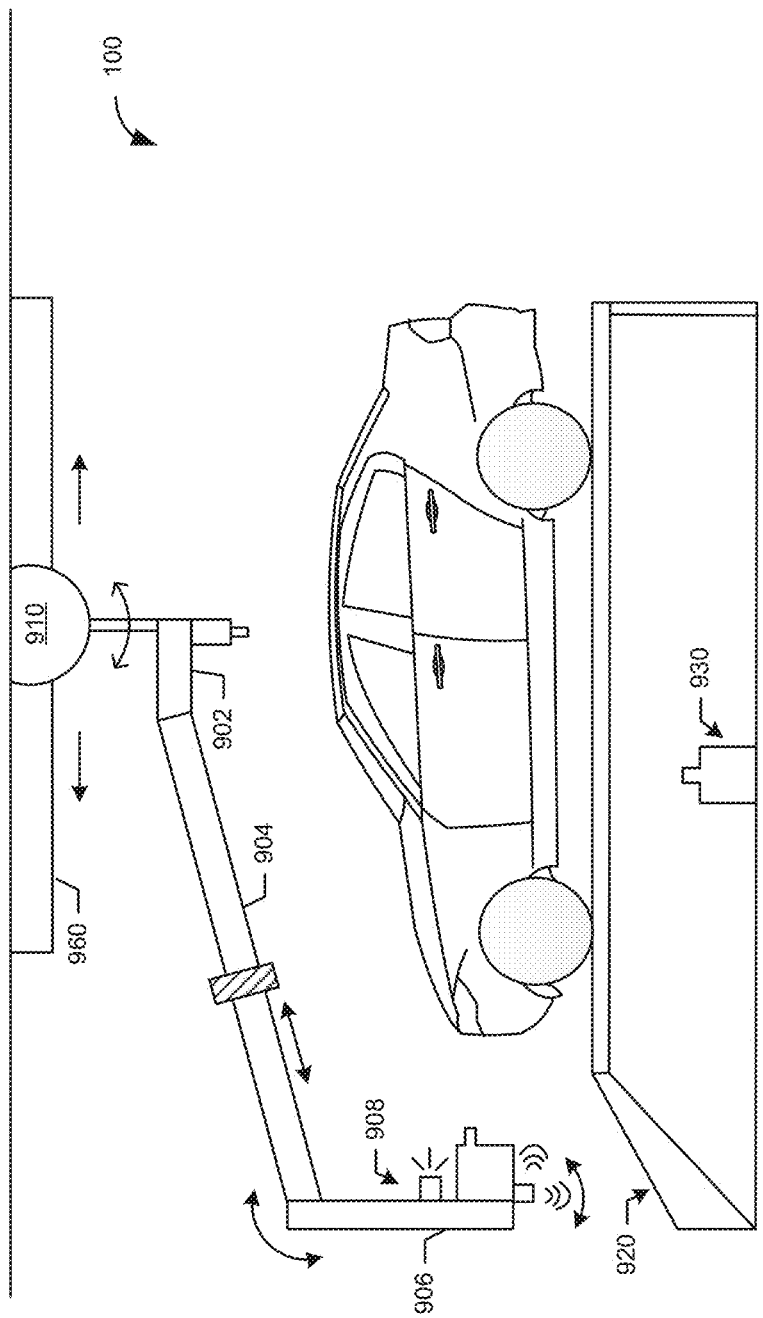
FIG. 3 depicts another telescoping boom system for automatic vehicle imaging in accordance with one or more embodiments of the disclosure.

Referring to FIG. 3, another embodiment of the vehicle imaging system 100 is illustrated. In this embodiment, a boom assembly 900 may include a first non-telescoping member 902 and a second telescoping member 904 that is coupled at an angle with respect to the first non-telescoping member 902. The second telescoping member 904 may have a camera mount 906 at or near one end, as well as a lighting assembly 908. The boom assembly 900 may be mounted to a ceiling with a ceiling mount 910 that is configured to move on a set of one or more tracks mounted to the ceiling. The vehicle imaging system 100 may also include a raised platform 920 with a ground-level camera 930 configured to capture images and/or video of an undercarriage of a vehicle 940 positioned on the raised platform 920. In some embodiments, the ground-level camera 930 may be positioned such that the camera 930 is flush with the floor. Utilizing a single telescoping member may result in reduced costs and/or complexity of the vehicle imaging system 100.

Figure 4:
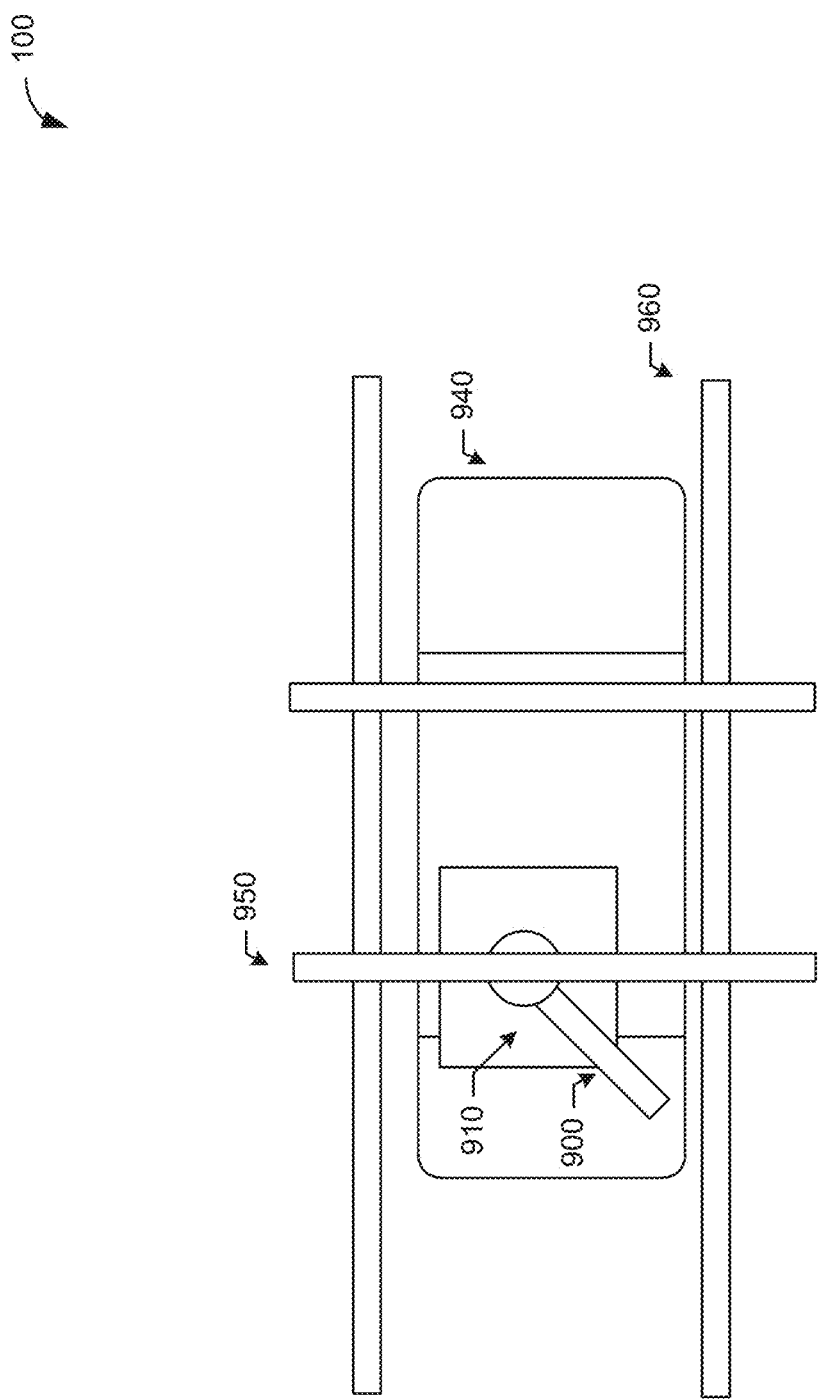
FIG. 4 depicts a top view of the system for automatic vehicle imaging of FIG. 3 in accordance with one or more embodiments of the disclosure.

Referring to FIG. 4, a top view of the vehicle imaging system 100 of FIG. 3 is illustrated. The maneuverable ceiling mount 910 may be moveable along a first pair or set of tracks 950 connected to a second pair or set of tracks 960. The first tracks 950 may be perpendicular to the second tracks 960. The ceiling mount 910 may be attached to a platform that can be moved along either or both the first tracks 950 and/or the second tracks 960 via a drive motor. By moving along the first or second tracks 950, 960, the vehicle imaging system 100 may be configured to position the ceiling mount 910 over a center point of the vehicle 940. Such positioning may allow for easier camera path calculations and/or more exact image capturing. In other embodiments, the tracks along which the ceiling mount can move may be circular instead of linear. The ceiling mount 910 may be powered by the drive motor of the vehicle imaging system 100. In some embodiments, movement of the ceiling mount 910 may be effectuated by an actuation system including bars and actuators that connect to a plate on which the ceiling mount 910 is mounted. The bars may be similar tracks. In some embodiments, the boom assembly 200 may be centered over a vehicle via one or more linkage members along which a ceiling mount may slide, either incrementally or variably, in one or both an x-direction or y-direction. In such embodiments, the ceiling mount may be configured to slide as the linkage members are manipulated, such that the ceiling mount is centered over the vehicle. Such embodiments may include springs, clamps, and/or balances to lock or otherwise keep the system from moving when not intended.

Figure 5:
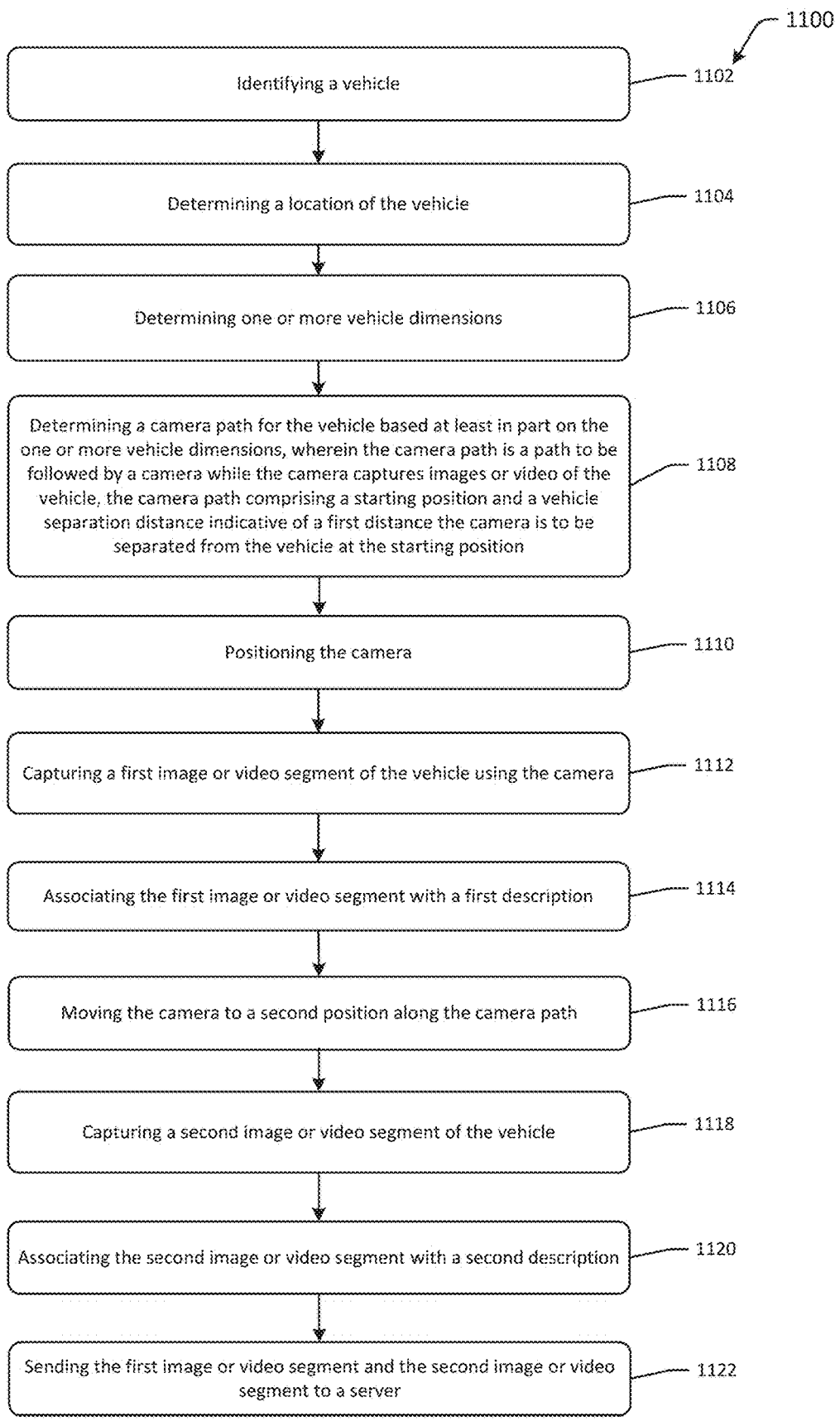
FIG. 5 depicts an example process flow for automatic vehicle imaging in accordance with one or more embodiments of the disclosure.

FIG. 5 schematically illustrates an example process flow 1100 for automatic vehicle imaging in accordance with one or more embodiments of the disclosure. Block 1102 of the process flow 1100 includes identifying a vehicle. For example, a vehicle may be identified by scanning an exterior of a vehicle with a camera, taking a picture of a portion of a vehicle, scanning a barcode or other machine readable code associated with the vehicle, receiving a vehicle identification number or other vehicle identifier associated with the vehicle, and the like.

Block 1104 of the process flow 1100 includes determining a location of the vehicle. A location of a vehicle may be determined, for example, by determining that the vehicle is positioned in a booth, by receiving a physical address or indication of physical location (e.g., satellite coordinates, etc.), by using a camera to identify and/or locate a vehicle of a particular make, model, color, style, or the like. In other embodiments, the dimensions may be determined by sensors on an entrance to a photo booth environment (or sensors mounted such that the vehicle passes between the sensors).

Block 1106 of the process flow 1100 includes determining one or more vehicle dimensions, such as a width, a height, and/or a length of the vehicle. Vehicle dimensions may be identified or determined via a database with stored vehicle dimensions, or in real-time via embodiments of the disclosure. For example, an unmanned aerial vehicle embodiment of the disclosure may circle a vehicle in order to determine vehicle dimensions. Similarly, a telescoping boom and/or unmanned ground vehicle may navigate and/or drive around an exterior of a vehicle at a distance in order to determine one or more vehicle dimensions.

Block 1108 includes determining a camera path for the vehicle based at least in part on the one or more vehicle dimensions, wherein the camera path is a path to be followed by a camera while the camera captures images or video of the vehicle. The camera path may be substantially elliptical and may be configured so as to guide the camera about an exterior surface of the vehicle. While following the camera path, the camera may continuously capture images and/or video of the vehicle. The camera path may include data such as elevation distances indicative of an elevation with respect to ground level that the camera should have at various positions along the camera path. The camera path may include vehicle separation distances indicative of a distance the camera should be separated from the vehicle at various positions along the camera path. The camera path may include camera orientation angles indicative of an angle at which the camera lens should be angled at various positions along the camera path so as to determine angles of images and/or video captured by the camera. The camera path may include a starting position that indicates an initial position from which the camera may begin capturing images and/or video. The camera path may also include relative elevation changes, which enable the camera to capture images of other features (e.g. wheels) that may be of interest.

Block 1110 includes positioning the camera. For example, the camera may be positioned at the starting position. The camera may be prepared to capture images and/or video. While at the starting position, the camera may be positioned at a vehicle separation distance indicated by the camera path. The camera may be positioned by a telescoping boom arm, for example, that may be mounted to a ceiling or to an unmanned vehicle, in some embodiments. The camera may be positioned in the starting position and at an initial vehicle separation distance using one or more sensors. In one embodiment, the camera may be positioned at the starting position by using images detected by the camera to identify a certain portion of the vehicle, such as a front, a driver's side, a rear, a passenger's side, and the like. In another example, using a lidar sensor coupled to the camera, embodiments of the disclosure may determine a distance between the camera and the vehicle, and/or a distance between the camera and ground level. Based on the respective distances, the camera may be moved until the distance is equal to the vehicle separation distance. The camera may be moved or positioned by a telescoping boom that may be attached to a ceiling or an unmanned vehicle in some embodiments. For example, a ceiling mounted telescoping boom may move the camera, or a camera may be mounted on a drone that moves the camera, or a camera may be mounted on a rover that moves the camera, and the like.

The camera may be moved along the camera path for example by operating a boom attached to the camera, by operating propellers of an unmanned aerial vehicle, by remotely operating a drive motor of an unmanned ground vehicle, or by another method. Vertical and horizontal positioning, as well as orientation, of the camera may be manipulated by a telescoping boom and/or an unmanned vehicle, which could also have a mast or boom, and might have a gear driven track thereon or other motorized adjustment mechanism(s).

Block 1112 includes capturing a first image or video segment of the vehicle using the camera. For example, at the starting position, the camera may automatically be operated to capture images and/or videos. Block 1114 includes associating the first image or video segment with a first description. The captured first image or video segment may be associated with a first description (e.g., front of vehicle, etc.) and/or position information indicating a position of the camera at the time the first image or video segment was captured. Images or video segments captured by the camera may be stored in a single file or in multiple data files and may be stored sequentially in some embodiments. The image or video segment descriptions may be searchable and may be used to identify images or video segments.

Block 1116 includes moving the camera to a second position along the camera path. As described, the camera may be moved along the camera path by one or more of a boom, a telescoping boom, an unmanned vehicle (e.g., using propellers of an unmanned aerial aircraft or drive motor of an unmanned ground vehicle, etc.), and the like.

Block 1118 includes capturing a second image or video segment of the vehicle. At the second position and/or in between the first and second positions, the camera may capture a second image or video segment. At block 1120, the process flow 110 includes associating the second image or video segment with a second description. The camera may not stop at individual positions in some embodiments, and may be in constant motion about the camera path from the starting point until the camera has completed the camera path. In other embodiments, the camera may stop at one or more positions while capturing images.

Block 1122 includes sending the first image or video segment and the second image or video segment to a server. The images or video segments sent may include the respective descriptions. In some embodiments, the server may generate the descriptions, while in other embodiments, the camera may generate the descriptions.

Figure 6:
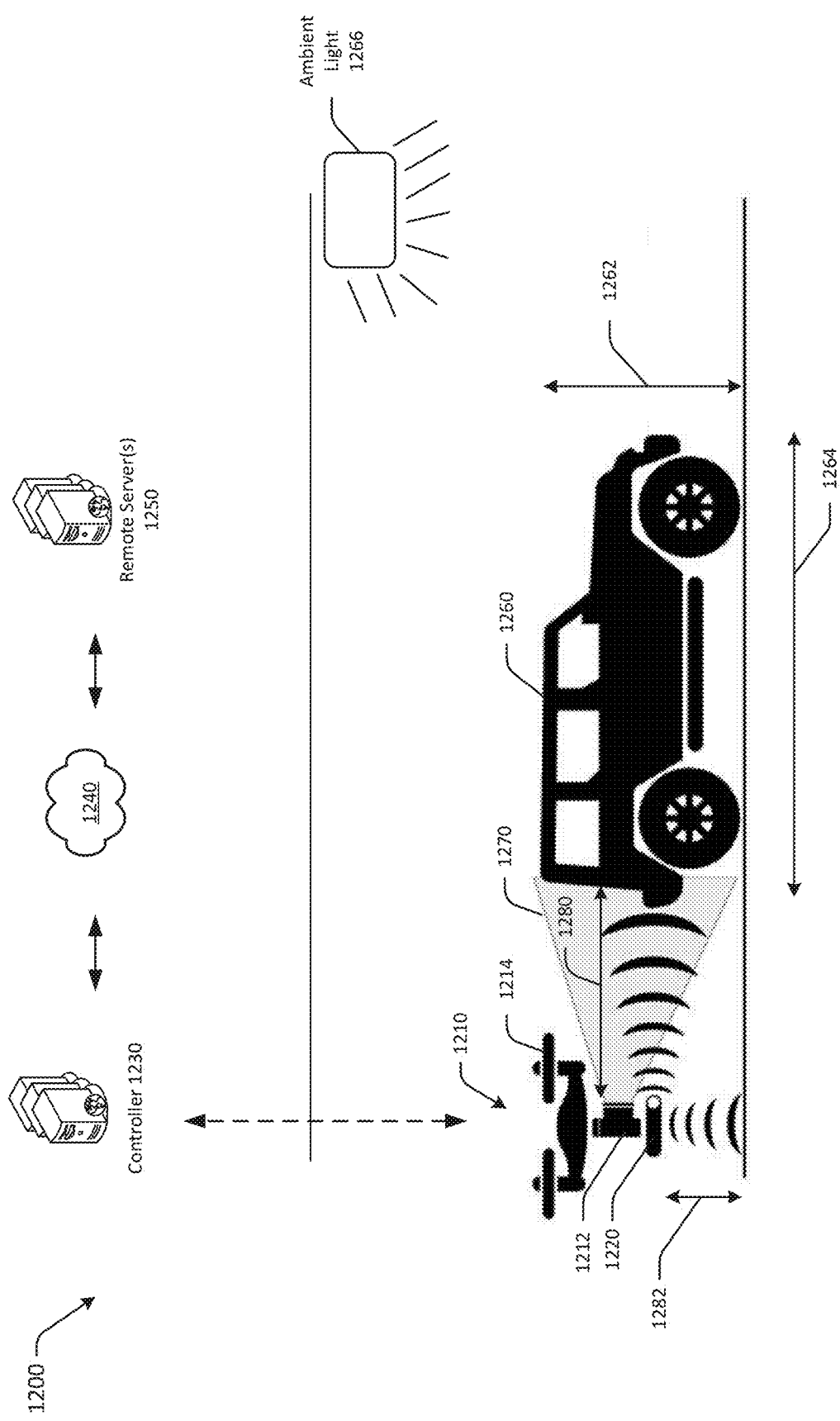
FIGS. 6-7 depict an unmanned aerial vehicle system for automatic vehicle imaging in accordance with one or more embodiments of the disclosure.

Referring to FIG. 6, an example unmanned aerial vehicle use case 1200 is depicted in accordance with one or more embodiments of the disclosure. Certain embodiments of the disclosure may include unmanned vehicles, such as unmanned aerial vehicle 1210 illustrated in FIGS. 6-7 or unmanned ground vehicle 1310 illustrated in FIGS. 8-9.

The unmanned aerial vehicle 1210 may include drive motors with blade assemblies and/or propellers 1214. In some embodiments, the unmanned aerial vehicle 1210 may be manually positioned at a starting point, for example by an operator. The unmanned aerial vehicle 1210 may include a power source. The unmanned aerial vehicle 1210 may include drive motors with blades to control the aerial path of the unmanned aerial vehicle 1210. The unmanned aerial vehicle 1210 may also include a 6 axis motorized gyro with gimbal to rotate or swivel. The 6 axis motorized gyro with gimbal may include one or more members of a camera 1212 coupled together. The drive motors with blades or propellers may be configured to move or otherwise operate the unmanned aerial vehicle 1210. For example, the drive motors with blades or propellers may cause rotation or other movement of the unmanned aerial vehicle 1210 and/or the rotation or other movement of the camera 1212 about the vehicle 1260.

The camera 1212 and one or more sensors 1220, such as a lidar sensor, may be coupled to the unmanned aerial vehicle 1210. In some embodiments, the camera 1212 and/or sensor 1220 may be integrated into the unmanned aerial vehicle 1210. The camera 1212 may be mounted to the unmanned aerial vehicle 1210 via a 6 axis motorized gyro with gimbal which may allow the camera 1212 to rotate along 6 axes with respect to the position and movements of the unmanned aerial vehicle 1210. The camera 1212 mounted to the 6 axis motorized gyro with gimbal may be configured such that angles of images captured by the camera 1212 with respect to the vehicle 1260 may be varied.

In some embodiments, the unmanned aerial vehicle 1210 may include a telescoping boom attached to the camera 1212 that may be configured to provide additional movement capabilities for the camera 1212. The unmanned aerial vehicle 1210 may include a gyroscope (e.g., a 6-axis motorized gyro) with an optional gimbal/stabilizer. The camera 1212 may be mounted to the gimbal and may be configured to rotate separately with respect to the unmanned aerial vehicle 1210, such that angles of images or videos captured by the camera 1212 may be adjusted. The unmanned aerial vehicle 1210 may be tethered to a ceiling, wall, or floor for power, for example to the ceiling of a booth or an outdoor canopy or floor power, or may include a portable power source and thus may be free flying. The unmanned aerial vehicle 1210 may have complete degrees of freedom, such that the unmanned aerial vehicle 1210 may rotate or swivel with respect to a vehicle 1260 (e.g., the unmanned aerial vehicle 1210 may freely move along the three-dimensional axes of space around a vehicle).

The unmanned aerial vehicle 1210 may be in wired or wireless communication with a controller 1230. The controller 1230 may be configured to control certain operations of the unmanned aerial vehicle 1210. For example, the controller 1230 may generate a camera path for the camera 1212 and may send the camera path to the unmanned aerial vehicle 1210 for execution. The controller 1230 may be in communication with one or more remote server(s) 1250 via one or more network(s) 1240. The remote server 1250 may serve as storage or may be used to identify vehicles, for example, with an image database, or for another purpose.

The vehicle 1260 may be positioned indoors, such as in a booth, or outdoors. Ambient light 1266 may be present in the environment the vehicle 1260 is in. The unmanned aerial vehicle 1210 may include a lighting assembly that provides additional light for images or video captured by the camera 1212.

The camera 1212 may have a field of vision 1270 that may be directed at various angles based at least in part on a position/angle of the unmanned aerial vehicle 1210, as well as by a configuration of a gimbal in certain embodiments.

The unmanned aerial vehicle 1210 may do a first pass about the vehicle 1260 to determine that the vehicle 1260 has a length 1264 and a height 1262. In some embodiments, the vehicle dimensions of the vehicle 1260 may be identified via a database.

The unmanned aerial vehicle 1210 may use the sensor 1220 to determine a vehicle separation distance 1280 and an elevation distance 1282 that may indicate vehicle separation distance and elevation distance for the unmanned aerial vehicle 1210 and/or for the camera 1212 specifically.

Figure 7:
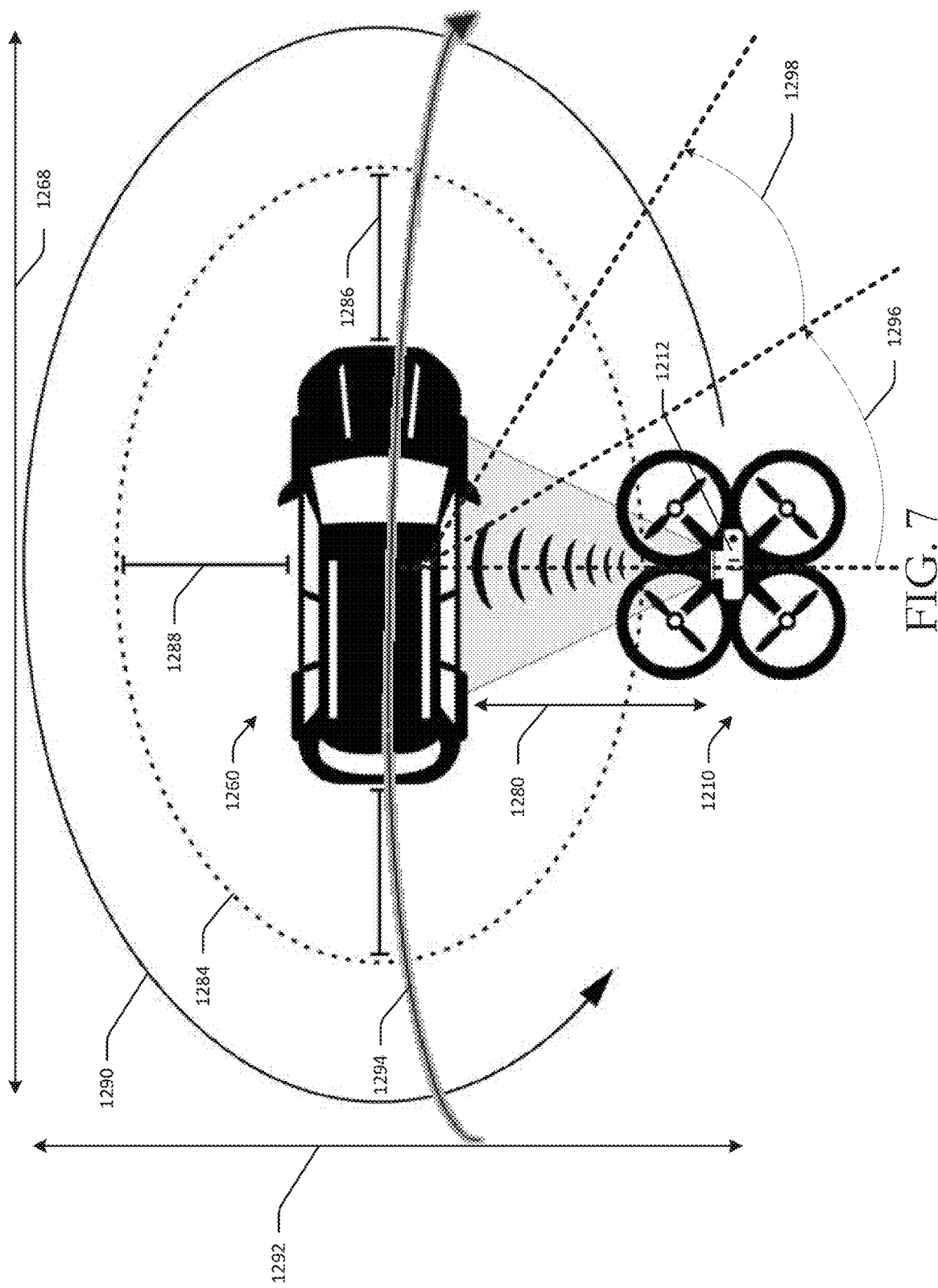

Referring to FIG. 7, a top view of FIG. 6 is depicted. The unmanned aerial vehicle 1210 may generate and/or receive a camera path 1284 for the vehicle 1260. The unmanned aerial vehicle 1210 may begin flying or moving about the camera path 1284 from a first position to a second position 1296 and to a third position 1298, and so forth. In some embodiments, a starting elevation may be about two-thirds the height 1262 of the vehicle 1260. The unmanned aerial vehicle 1210 may move in a fluid motion or in segments. The unmanned aerial vehicle 1210 may fly about the camera path in direction 1290 or in the opposite direction.

The camera path 1284 may have a major axis 1268 that is greater than the length 1264 of the vehicle 1260, as well as a minor axis 1292 that is greater than a width of the vehicle 1260. The camera path 1284 may include a flyover portion 1294 during which the unmanned aerial vehicle 1210 is to fly over a top of the vehicle 1260 and capture top views, for example. The camera path 1284 may include a first vehicle separation distance 1286 at a certain location along the camera path 1284, and a second vehicle separation distance 1288 at a second location along the camera path 1284 (and the separation distance may vary at points in between). The vehicle separation distances may be the same or different.

The unmanned aerial vehicle 1210 may initiate an imaging process by capturing images and/or video of the vehicle 1260 while moving the camera 1212 along the camera path 1284. For example, the unmanned aerial vehicle 1210 and/or 6 axis motorized gyro with gimbal may move the camera 1212 about the camera path 1284. The unmanned aerial vehicle 1210 may manipulate the 6 axis motorized gyro with gimbal to control angles and positioning of the camera 1212 with respect to the vehicle 1260. The unmanned aerial vehicle 1210 may move the camera 310 continuously, for example at a speed of 3 miles per hour along the camera path (although the speed may be slower or faster than 3 miles per hour). The camera 1212 may be in continuous motion at a constant rate of speed in some embodiments, and images may be captured while the camera 1212 is in motion. In some embodiments, the camera 1212 may be stopped at predetermined intervals while images are captured. The unmanned aerial vehicle 1210 may adjust the elevation 1282 of the camera 1212 relative to the floor or ground level, depending on where the camera 1212 is in the camera path 1284.

The camera 1212 may capture images and/or video continuously or at certain positions about the camera path. For example, the camera 1212 may capture an image after every 10 degrees of movement about the camera path or other constant or variable increments as discussed elsewhere herein. During movement about the camera path, the camera 1212 may be adjusted to maintain the desired orientation to the vehicle (e.g., angle at which images are captured).

Figure 8:
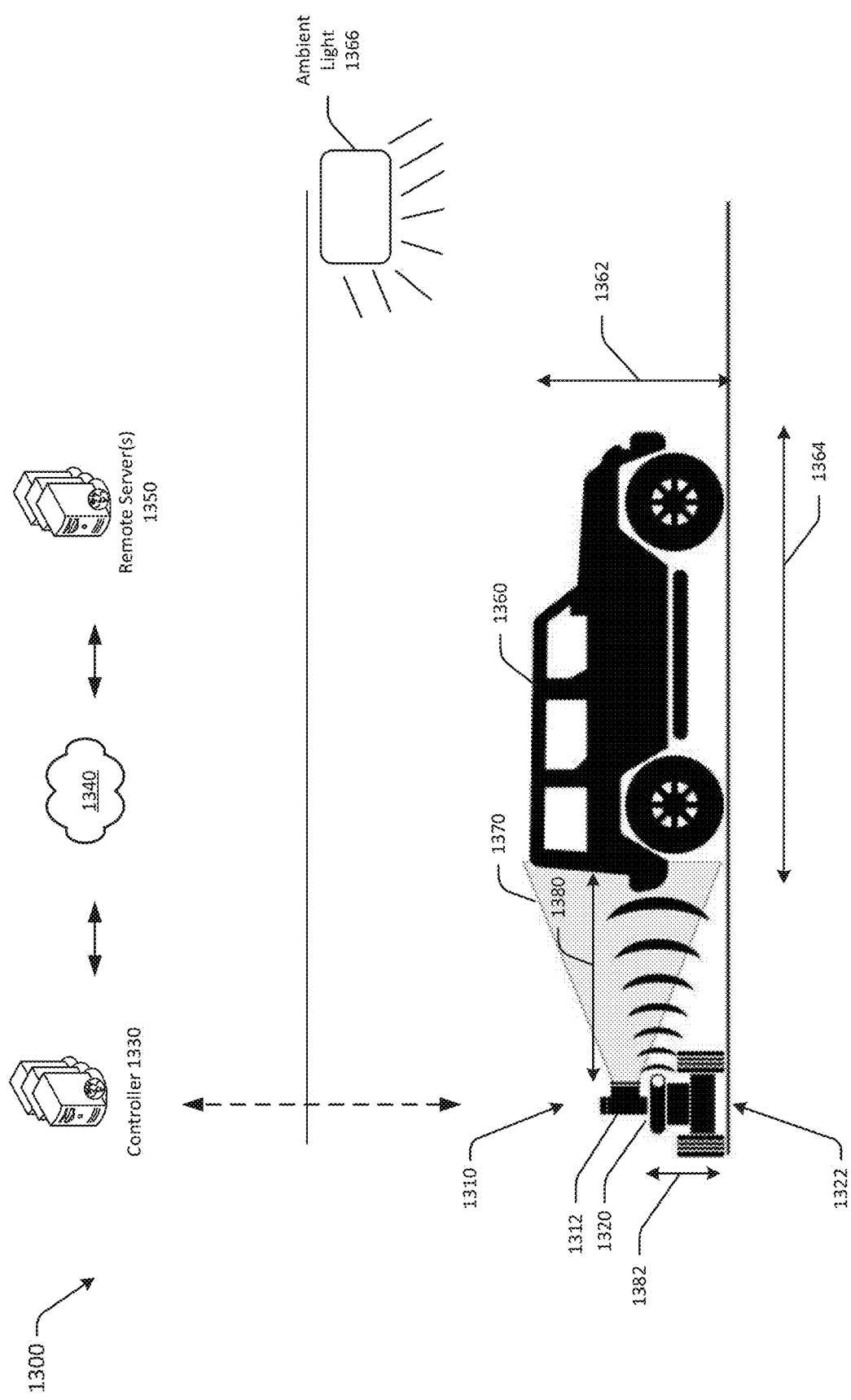
FIGS. 8-9 depict an unmanned ground vehicle system for automatic vehicle imaging in accordance with one or more embodiments of the disclosure.
Figure 9:
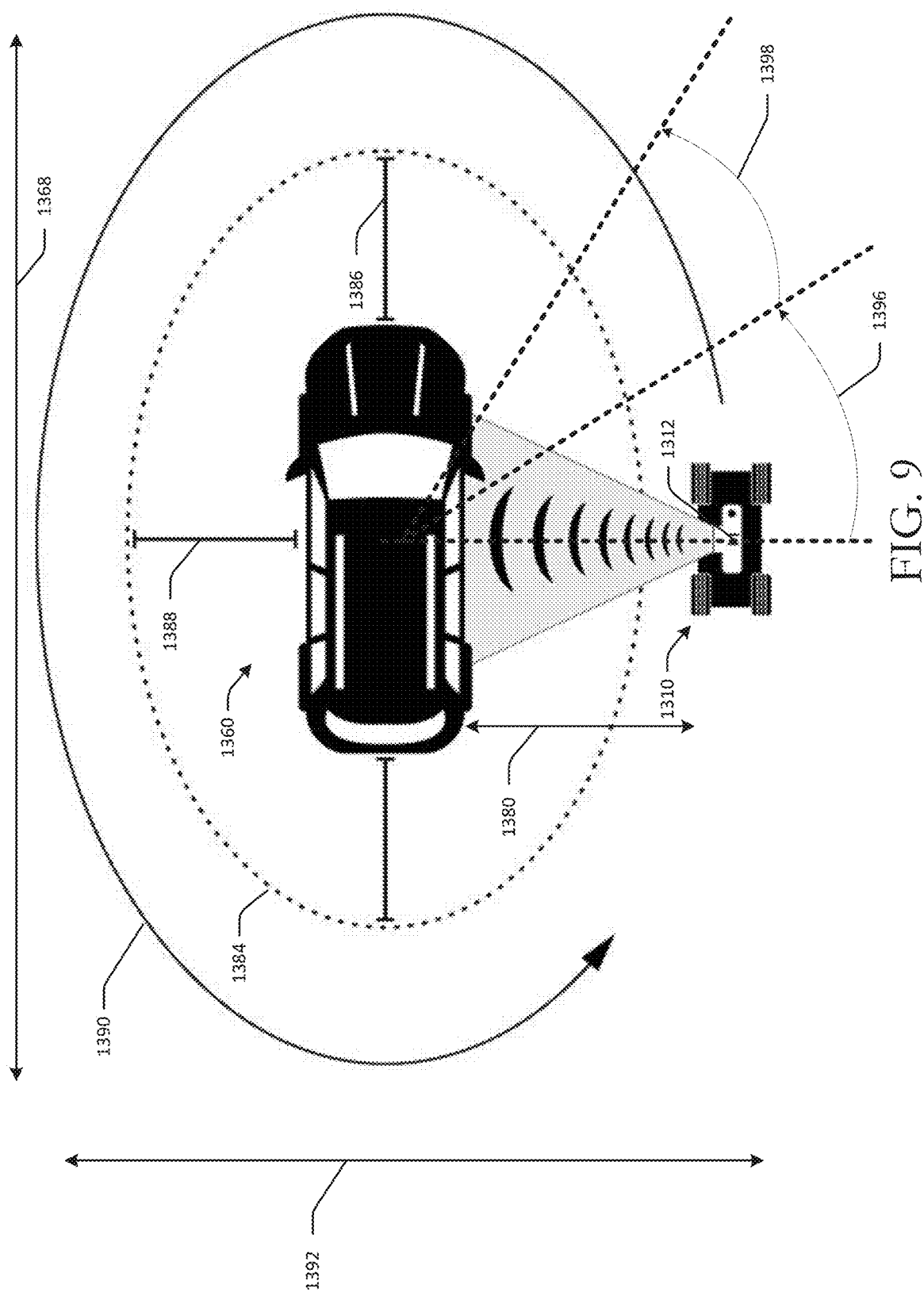

Referring to FIGS. 8-9, an example unmanned ground vehicle use case 1300 is depicted in accordance with one or more embodiments of the disclosure. An unmanned ground vehicle 1310 may be configured to drive on a ground surface and to guide a camera 1312 along a camera path. The unmanned ground vehicle 1310 may optionally include a telescoping boom coupled to the camera 1312, as well as a lighting assembly and/or power source in some embodiments.

The unmanned ground vehicle 1310 may include a drive motor with tire/track system assembly 1322. The drive motor with tire/track system assembly 1322 may be configured to move or otherwise operate the unmanned ground vehicle 1310. For example, the drive motor with tire/track system assembly 1322 may cause rotation or other movement of the unmanned ground vehicle 1310 and/or the rotation or other movement of the camera 1312 about a vehicle 1360. The unmanned ground vehicle 1310 may also include a 6 axis motorized gyro with gimbal to rotate or swivel with respect to the unmanned ground vehicle 1310. The 6 axis motorized gyro with gimbal may include one or more members of the camera 1312 coupled together. The telescoping boom, in some embodiments, may be configured to move perpendicular from the unmanned ground vehicle 1310 to an extension that may reach a vehicle height 1362.

The camera 1312 and one or more sensors 1320, such as a lidar sensor, may be coupled to the unmanned ground vehicle 1310. In some embodiments, the camera 1312 and/or sensor 1320 may be integrated into the unmanned ground vehicle 1310. The camera 1312 may be mounted to the unmanned ground vehicle 1310 via a 6 axis motorized gyro with gimbal which may allow the camera 1312 to rotate along 6 axes with respect to the position and movements of the unmanned ground vehicle 1310. The camera 1312 mounted to the 6 axis motorized gyro with gimbal may be configured such that angles of images captured by the camera 1312 with respect to the vehicle 1360 may be varied.

In some embodiments, the unmanned ground vehicle 1310 may include a telescoping boom attached to the camera 1312 that may be configured to provide additional movement capabilities for the camera 1312. The unmanned ground vehicle 1310 may include a gyroscope (e.g., a 6-axis motorized gyro) with an optional gimbal/stabilizer. The camera 1312 may be mounted to the gimbal and may be configured to rotate separately with respect to the unmanned ground vehicle 1310, such that angles of images or videos captured by the camera 1312 may be adjusted. The unmanned ground vehicle 1310 may be tethered to a ceiling, wall, or floor for power, for example to the ceiling of a booth or an outdoor canopy or floor power, may include a portable power source or may include a wireless powersource, such as induction charging, and thus may be free roaming. The unmanned ground vehicle 1310 may have complete degrees of freedom, such that the unmanned ground vehicle 1310 may rotate or swivel with respect to a vehicle 1360 (e.g., the unmanned ground vehicle 1310 may freely move along the three-dimensional axes of space around a vehicle).

The unmanned ground vehicle 1310 may be in wired or wireless communication with a controller 1330. The controller 1330 may be configured to control certain operations of the unmanned ground vehicle 1310. For example, the controller 1330 may generate a camera path for the camera 1312 and may send the camera path to the unmanned ground vehicle 1310 for execution. The controller 1330 may be in communication with one or more remote server(s) 1350 via one or more network(s) 1340. The remote server 1350 may serve as storage or may be used to identify vehicles, for example, with an image database, or for another purpose.

The vehicle 1360 may be positioned indoors, such as in a booth, or outdoors. Ambient light 1366 may be present in the environment the vehicle 1360 is in. The unmanned ground vehicle 1310 may include a lighting assembly that provides additional light for images or video captured by the camera 1312.

The camera 1312 may have a field of vision 1370 that may be directed at various angles based at least in part on a position/angle of the unmanned ground vehicle 1310, as well as by a configuration of a gimbal in certain embodiments.

The unmanned ground vehicle 1310 may do a first pass about the vehicle 1360 to determine that the vehicle 1360 has a length 1364 and a height 1362. In some embodiments, the vehicle dimensions of the vehicle 1360 may be identified via a database.

The unmanned ground vehicle 1310 may use the sensor 1320 to determine a vehicle separation distance 1380 and an elevation distance 1382 that may indicate vehicle separation distance and elevation distance for the unmanned ground vehicle 1310 and/or for the camera 1312 specifically. In some embodiments the elevation 1382 may be fixed, while in other embodiments, the unmanned ground vehicle 1310 may include a telescoping boom, motorized track or the like that allows adjustment of elevation.

Referring to FIG. 9, a top view of FIG. 9 is depicted. The unmanned ground vehicle 1310 may generate and/or receive a camera path 1384 for the vehicle 1360. The unmanned ground vehicle 1310 may begin driving or moving about the camera path 1384 from a first position to a second position 1396 and to a third position 1398, and so forth. In some embodiments, a starting elevation may be about two-thirds the height 1362 of the vehicle 1360. The unmanned ground vehicle 1310 may move in a fluid motion or in segments. The unmanned ground vehicle 1310 may drive about the camera path in direction 1390 or in the opposite direction.

The camera path 1384 may have a major axis 1368 that is greater than the length 1364 of the vehicle 1360, as well as a minor axis 1392 that is greater than a width of the vehicle 1360. The camera path 1384 may include a first vehicle separation distance 1386 at a certain location along the camera path 1384, and a second vehicle separation distance 1388 at a second location along the camera path 1384. The vehicle separation distances may be the same or different (and vary along the camera path 1384).

The unmanned ground vehicle 1310 may initiate an imaging process by capturing images and/or video of the vehicle 1360 while moving the camera 1312 along the camera path 1384. For example, the unmanned ground vehicle 1310 and/or 6 axis motorized gyro with gimbal may move the camera 1312 about the camera path 1384. The unmanned ground vehicle 1310 may manipulate the 6 axis motorized gyro with gimbal to control angles and positioning of the camera 1312 with respect to the vehicle 1360. The unmanned ground vehicle 1310 may move the camera 310 continuously, for example at a speed of 3 miles per hour along the camera path (although the speed may be slower or faster than 3 miles per hour). The camera 1312 may be in continuous motion at a constant rate of speed in some embodiments, and images may be captured while the camera 1312 is in motion. In some embodiments, the camera 1312 may be stopped at predetermined intervals while images are captured. The unmanned ground vehicle 1310 may adjust the elevation 1382 of the camera 1312 relative to the floor or ground level, depending on where the camera 1312 is in the camera path 1384.

The camera 1312 may capture images and/or video continuously or at certain positions about the camera path. For example, the camera 1312 may capture an image after every 10 degrees of movement about the camera path. During movement about the camera path, the camera 1312 may be adjusted to maintain the desired orientation to the vehicle (e.g., angle at which images are captured).

Figure 10:
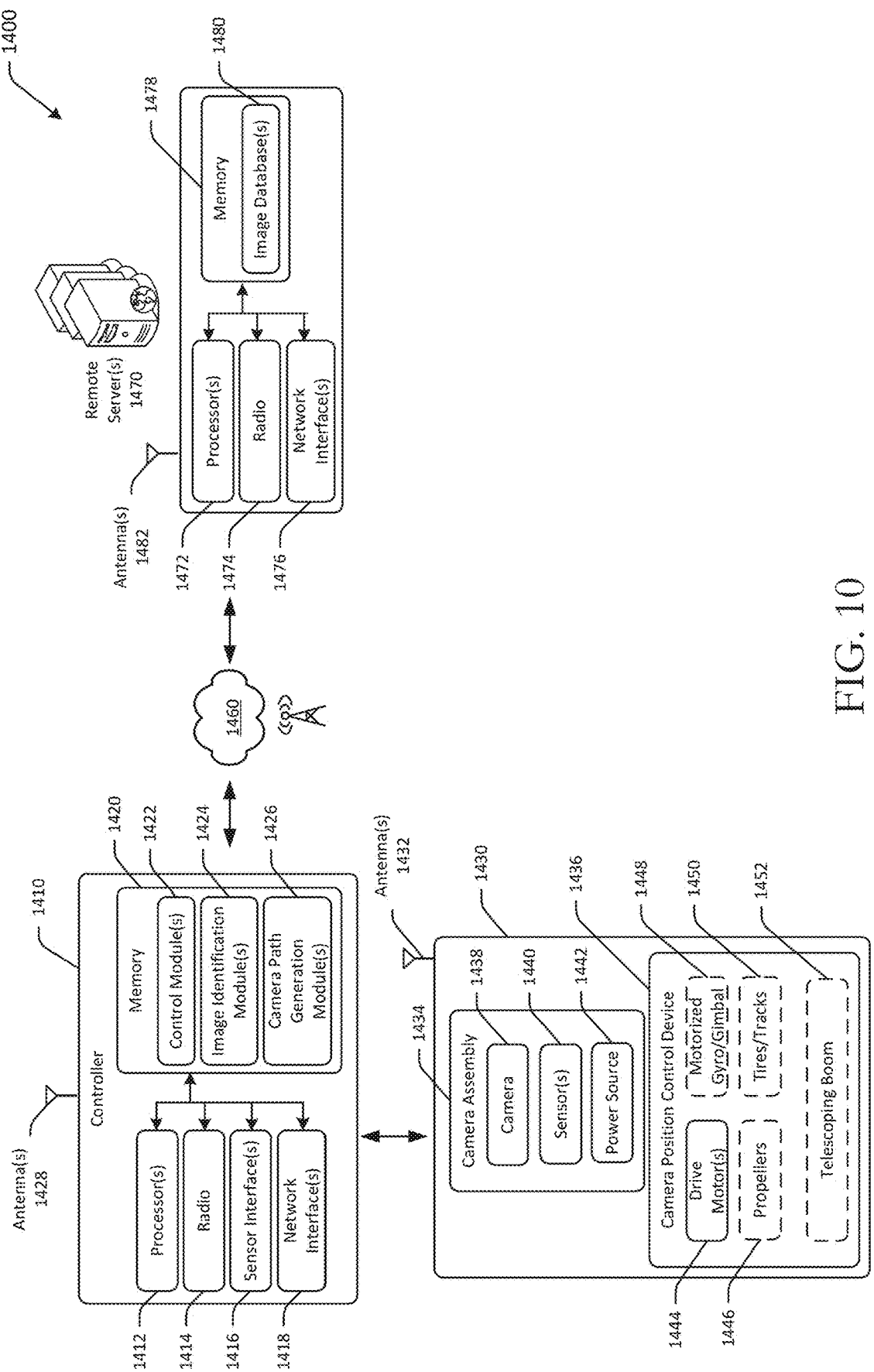
FIG. 10 depicts an example system architecture of a system for automatic vehicle imaging in accordance with one or more embodiments of the disclosure.

Referring to FIG. 10, example vehicle imaging system 1400 architecture is illustrated. The vehicle imaging system 1400 may include one or more controller(s) 1410 in communication with one or more camera systems 1430. The controller 1410 and/or camera system 1430 may be in communication with one or more remote server(s) 1470 via one or more network(s) 1460.

The controller 1410 may refer to any type of electronic device, and, more particularly, may refer to one or more of the following: a wireless communication device, a portable electronic device, a telephone (e.g., cellular phone, smart phone), a computer (e.g., laptop computer, tablet computer), a wearable computer device, a portable media player, a personal digital assistant (PDA), or any other electronic device having a networked capability.

The controller 1410 may include one or more computer processors 1412, a radio 1414, one or more sensor interface(s) 1416, one or more network interface(s) 1418, a memory 1420 that may store an operating system (O/S), a control module 1422, an image identification module 1424, a camera path generation module 1426, and one or more antenna(e) 1428. In addition, the controller 1410 may include one or more I/O interfaces and a display. The computer processors may comprise one or more cores and may be configured to access and execute (at least in part) computer-readable instructions stored in the memory. The one or more computer processors may include, without limitation: a central processing unit (CPU), a digital signal processor (DSP), a reduced instruction set computer (RISC), a complex instruction set computer (CISC), a microprocessor, a microcontroller, a field programmable gate array (FPGA), or any combination thereof. The controller may also include a chipset (not shown) for controlling communications between the one or more processors and one or more of the other components of the controller. The one or more processors may also include one or more application-specific integrated circuits (ASICs) or application-specific standard products (ASSPs) for handling specific data processing functions or tasks.

The memory may include one or more computer-readable storage media (CRSM). In some embodiments, the memory may include non-transitory media such as random access memory (RAM), flash RAM, magnetic media, optical media, solid state media, and so forth. The memory may be volatile (in that information is retained while providing power) or non-volatile (in that information is retained without providing power). Additional embodiments may also be provided as a computer program product including a transitory machine-readable signal (in compressed or uncompressed form). Examples of machine-readable signals include, but are not limited to, signals carried by the Internet or other networks. For example, distribution of software via the Internet may include a transitory machine-readable signal. Additionally, the memory may store an operating system that includes a plurality of computer-executable instructions that may be implemented by the computer processor to perform a variety of tasks to operate the interface(s) and any other hardware installed on the controller. The memory may also store content that may be displayed by the controller or transferred to other devices. The memory may also store content received from the other devices.

The memory may also include an operating system (O/S), which may provide an interface between other application software executing on the controller and hardware resources of the controller. More specifically, the operating system may include a set of computer-executable instructions for managing hardware resources of the controller and for providing common services to other application programs (e.g., managing memory allocation among various application programs). The operating system may include any operating system now known or which may be developed in the future including, but not limited to, any consumer operating system, any server operating system, any mainframe operating system, or any other proprietary or freely available operating system.

Referring again to the controller 1410, the one or more network and I/O interfaces may include one or more communication interfaces or network interface devices to provide for the transfer of data between the controller and another device (e.g., network server) via one or more networks, such as 1460. The communication interfaces may include, but are not limited to: personal area networks (PANs), wired local area networks (LANs), wireless local area networks (WLANs), wireless wide area networks (WWANs), and so forth. The controller may be coupled to the network via a wired connection. However, the wireless system interfaces may include the hardware and software to broadcast and receive messages either using the Wi-Fi Direct Standard (see Wi-Fi Direct specification published in October 2010) and/or the IEEE 802.11 wireless standard (see IEEE 802.11-2007, published Mar. 8, 2007; IEEE 802.11n-2009, published October 2009), or a combination thereof. The wireless system may include a transmitter and a receiver or a transceiver capable of operating in a broad range of operating frequencies governed by the IEEE 802.11 wireless standards. The communication interfaces may utilize acoustic, radio frequency, optical, or other signals to exchange data between the controller and another device, such as an access point, a host computer, a server, a router, a reader device, and the like. The networks may include, but are not limited to, the Internet, a private network, a virtual private network, a wireless wide area network, a local area network, a metropolitan area network, a telephone network, and so forth.

The control module 1422 may be configured to send commands to unmanned vehicles, booms, or camera assemblies. The image identification module 1424 may be configured to communicate with remote servers and/or to identify vehicles based on images or requests received from the camera system 1430. The camera path generation module 1426 may be configured to generate camera paths for one or more vehicles and/or camera systems 1430.

The camera system 1430 may include one or more antenna(e) 1432, a camera assembly 1434, and a camera position control device 1436. The camera system 1430 may be configured to communicate with the controller 1410 and/or the remote server 1470. The camera assembly 1434 may include a camera 1438, one or more sensors 1440, and optionally a power source 1442. The camera position control device 1436 may include one or more drive motor(s) 1444 and may optionally include one or more of the following: propellers 1446, motorized gyro/gimbal 1448, tires/tracks 1450, or a telescoping boom 1452.

The remote server 1470 may include one or more processors 1472, a radio 1474, a network interface 1476, and a memory 1478 that may include an image database(s) 1480 stored thereon. The image database 1480 may be used to identify vehicles, to store vehicle images and/or videos and related descriptions, and the like.

Certain embodiments of the present disclosure are described above with reference to block and flow diagrams of systems and methods and/or computer program products according to example embodiments of the present disclosure. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the present disclosure.

These computer-executable program instructions may be loaded onto a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the present disclosure may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While certain embodiments of the present disclosure have been described in connection with what is presently considered to be the most practical and various embodiments, it is to be understood that the present disclosure is not to be limited to the disclosed embodiments, but is intended to cover various modifications and equivalent arrangements included within the scope of the appended claims. Although specific terms are employed herein, they are used in a generic and descriptive sense only and not for purposes of limitation.

This written description uses examples to disclose certain embodiments of the present disclosure, including the best mode, and also to enable any person skilled in the art to practice certain embodiments of the present disclosure, including making and using any devices or systems and performing any incorporated methods. The patentable scope of certain embodiments of the present disclosure is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:
a camera;
a light detection and ranging (Lidar) sensor configured to detect Lidar data;
at least one memory that stores computer-executable instructions; and
at least one processor configured to access the at least one memory and execute the computer-executable instructions to:
 determine, based at least in part on the Lidar data, a first distance between the camera and a vehicle, wherein the first distance is associated with at a camera path followed by the camera while capturing images or video of the vehicle;
 determine a first angle of the camera with respect to the vehicle, wherein the first angle is associated with the camera path;
 determine, based at least in part on the Lidar data, that the camera is at a first position having a second distance from the vehicle and having a second angle with respect to the vehicle, wherein the second distance is different than the first distance, and wherein the second angle is different than the first angle;
 cause the camera to move from the first position to a second position, the second position having the first distance and the first angle; and
 cause the camera to capture a first image or video segment of the vehicle.

2. The system of claim 1, further comprising:
a telescoping boom coupled to the camera, the telescoping boom comprising a first telescoping member and a second telescoping member;
wherein the first telescoping member is rotatably coupled to the second telescoping member, and wherein the camera is mounted on the second telescoping member.

3. The system of claim 2, further comprising:
a lighting assembly mounted on the telescoping boom;
a ceiling mount coupled to the telescoping boom, the ceiling mount comprising a ceiling mount joint configured to rotate with respect to the ceiling mount, wherein the telescoping boom is rotatably coupled to the ceiling mount joint, such that the telescoping boom is configured to swivel with respect to the ceiling mount; and
a drive motor coupled to the telescoping boom and configured to control movement of the first telescoping member, the second telescoping member, the camera, and swiveling of the telescoping boom;
wherein the camera is moved along the camera path via the telescoping boom.

4. The system of claim 2, further comprising:
an unmanned ground vehicle comprising a drive motor, the unmanned ground vehicle configured to drive on a ground surface and to guide the camera along the camera path;
wherein the telescoping boom is coupled to the unmanned ground vehicle.

5. The system of claim 1 wherein the first image or video segment comprises a continuous video.

6. The system of claim 2, wherein the camera is configured to rotate with respect to the second telescoping member.

7. The system of claim 1, further comprising:
an unmanned aerial vehicle coupled to the camera, the unmanned aerial vehicle configured to guide the camera along the camera path.

8. The system of claim 7, wherein the at least one processor is further configured to:
determine a location of a feature of the vehicle, wherein the camera path includes a third position based at least in part on the location.

9. The system of claim 1, wherein the at least one processor is configured to cause the camera to move to from the first position to the second position by moving the camera until a third distance between the camera and the vehicle is equal to the first distance.

10. The system of claim 1, wherein the at least one processor is configured to cause the camera to adjust the second angle of the camera to the first angle with respect to the vehicle.

11. The system of claim 1, wherein the camera is in constant motion about the camera path from the first position until the camera has completed the camera path.

12. The system of claim 1, wherein the first distance corresponds to a first elevation which to maintain the camera path for the vehicle, and wherein the at least one processor is further configured to:
determine position data using the Lidar data;
determine orientation data using the Lidar data;
determine that the camera is positioned at a second elevation relative to the vehicle based at least in part on the position data and the orientation data, wherein the second elevation is different from the first elevation; and
cause the camera to adjust a position of the camera and an orientation of the camera to correspond to the first elevation relative to the vehicle.

13. A method comprising:
determining, based at least in part on light detection and ranging (Lidar) data, a first distance between a camera and a vehicle, wherein the first distance is associated with a camera path followed by the camera while capturing images or video of the vehicle;
determine a first angle of the camera with respect to the vehicle, wherein the first angle is associated with the camera path;
determining, based at least in part on the Lidar data, that the camera is at a first position having a second distance from the vehicle and having a second angle with respect to the vehicle, wherein the second distance is different than the first distance, and wherein the second angle is different than the first angle;
moving, based at least in part on the Lidar data, the camera from the first position to a second position, the second position having the first distance and the first angle; and
capturing a first image or video segment of the vehicle using the camera.

14. The method of claim 13, wherein moving the camera to from the first position to the second position comprises:
moving the camera until a third distance between the camera and the vehicle is equal to the first distance.

15. The method of claim 13, wherein moving the camera to the second position along the camera path comprises operating a boom attached to the camera.

16. The method of claim 13, further comprising:
determining a location of a feature of the vehicle, wherein the camera path includes a third position based at least in part on the location.

17. The method of claim 13, further comprising:
adjusting the second angle of the camera to the first angle with respect to the vehicle.

18. The method of claim 13, wherein the camera is in constant motion about the camera path from the first position until the camera has completed the camera path.

19. The system of claim 1, wherein the first distance corresponds to a first elevation which to maintain the camera path for the vehicle, and wherein the at least one processor is further configured to:
determine position data using the Lidar data;
determine orientation data using the Lidar data;
determine that the camera is positioned at a second elevation relative to the vehicle based at least in part on the position data and the orientation data, wherein the second elevation is different from the first elevation; and
cause the camera to adjust a position of the camera and an orientation of the camera to correspond to the first elevation relative to the vehicle.

* * * * *